United States Patent
Kim et al.

(10) Patent No.: US 9,182,525 B2
(45) Date of Patent: Nov. 10, 2015

(54) RETRO REFLECTOR INCLUDING AT LEAST ONE CORNER AND TWO MUTUALLY PARALLEL VERTICAL FACES

(76) Inventors: Hyeonsik Kim, Seoul (KR); Bongju Kim, Seoul (KR)

(*) Notice: Subject to any disclaimer, the term of this patent is extended or adjusted under 35 U.S.C. 154(b) by 385 days.

(21) Appl. No.: 12/810,014

(22) PCT Filed: Dec. 22, 2008

(86) PCT No.: PCT/KR2008/007594
§ 371 (c)(1), (2), (4) Date: Jun. 21, 2010

(87) PCT Pub. No.: WO2009/082154
PCT Pub. Date: Jul. 2, 2009

(65) Prior Publication Data
US 2010/0265585 A1 Oct. 21, 2010

(30) Foreign Application Priority Data

Dec. 21, 2007 (KR) .......... 10-2007-0135331
Dec. 21, 2007 (KR) .......... 10-2007-0135336
Dec. 21, 2007 (KR) .......... 10-2007-0135391

(51) Int. Cl.
G02B 5/124 (2006.01)
B60Q 7/00 (2006.01)
G02B 5/122 (2006.01)

(52) U.S. Cl.
CPC ............. *G02B 5/124* (2013.01); *B60Q 7/005* (2013.01); *G02B 5/122* (2013.01)

(58) Field of Classification Search
CPC ............ B60Q 1/30; B60Q 1/32; B60Q 7/00; B60Q 7/005; G02B 5/12; G02B 5/124; G02B 5/122; G02B 5/136; G09F 13/16; G09F 7/00; E01F 9/00; E01F 9/044; E01F 9/015; E01F 9/0122
See application file for complete search history.

(56) References Cited

U.S. PATENT DOCUMENTS 4,349,598 A * 9/1982 White ............... 428/161
6,282,026 B1 * 8/2001 Dreyer et al. ......... 359/529
(Continued)

FOREIGN PATENT DOCUMENTS

KR 10-2000-0016171 3/2000
KR 10-2006-0007038 7/2006
(Continued)

OTHER PUBLICATIONS

International Search Report for PCT/KR2008/007594 mailed Aug. 28, 2009.

*Primary Examiner* — Jennifer L. Doak
*Assistant Examiner* — Jyotsna Dabbi
(74) *Attorney, Agent, or Firm* — Novick, Kim & Lee, PLLC; Jae Youn Kim

(57) ABSTRACT

A retroreflective article enabling to retroreflect incident light in its incident direction, and the retroreflective article including at least one retroreflective element, the retroreflective element including at least one reflecting corner comprised of a pair of corner reflecting surfaces which meet at dihedral angle of about 90 degrees; and a pair of vertical reflecting surfaces which are formed on both ends of the reflecting corner to be substantially perpendicular to a corner of the reflecting corner with a distance which is smaller than the highest vertical height and which meet at dihedral angle of about 90 degrees for the pair of corner reflecting surfaces. This retroreflective article has higher retroreflective ratio and wider available retroreflective range, and it is designed to be freely changed its main reflecting direction having the highest retroreflective ratio.

15 Claims, 14 Drawing Sheets

(56) References Cited

U.S. PATENT DOCUMENTS 6,767,102 B1 * 7/2004 Heenan et al. ............... 359/530
7,309,135 B2 * 12/2007 Smith ........................... 359/530

FOREIGN PATENT DOCUMENTS

KR    10-2007-0102329        10/2007
WO    WO 2007083980 A1 *    7/2007

* cited by examiner (a) (b) (c)

(d) (e)

RETRO REFLECTOR INCLUDING AT LEAST ONE CORNER AND TWO MUTUALLY PARALLEL VERTICAL FACES

RELATED APPLICATIONS

This application is a 371 application of International Application No. PCT/KR2008/007594, filed Dec. 22, 2008, which in turn claims priority from Korean Patent Application Nos. 10-2007-0135391, filed Dec. 21, 2007, 10-2007-0135336, filed Dec. 21, 2007, and 10-2007-0135331, filed Dec. 21, 2007, all of which are incorporated herein by reference in their entireties.

TECHNICAL FIELD

The present invention relates to a retroreflective article, and more particularly, to a retroreflective article enabling to retroreflect incident light in its incident direction.

BACKGROUND ART

A variety of traffic safety facilities such as traffic signs, pavement markers, delineators and tripods or goods which should be importantly confirmed their visibility at rainy day or at night such as safety clothes, automobiles, bicycles, helmets and shoes are installed with or attached with a retroreflective article enabling to increase the visibility for the goods by retro-reflecting the incident light from front side thereof toward the light source radiating the light.

Conventionally, a retroreflective article provided with a glass bead or a cube corner has been usually used as the retroreflective article which will be applied to the goods which should be importantly confirmed their visibility.

However, the conventional retroreflective article has an inferior retro-reflection range at high angles of incidence because for the light having high incident angle the retroreflective article has low retroreflective ratio which is expressed as the ratio of the quantity of retro-reflected light to the quantity of incident light is low.

For example, in the case of the conventional retroreflective article using glass beads, because the light incident on the edges of the glass beads or into gaps between the glass beads is not well retro-reflected, the overall retro-reflection ratio is lowered, and thus brightness is low.

In the case of the conventional retroreflective article using cube corners, the overall retro-reflection ratio is high compared to the conventional retroreflective article using glass beads. However, when the incident angle of the light becomes large due to movement of the light source, the apparent area of the exposure surface (i.e. the area of the exposure surface when viewed from the direction of the light source) has no alternative but to be geometrically reduced. At this time, because the percentage of the retro-reflection area capable of retro-reflecting the light incident on the exposure surface is further reduced, the conventional retroreflective article using cube corners has a problem in that the brightness is sharply lowered in proportion to the magnitude of the incident angle. Therefore, the retro-reflection range of the incident angle, i.e. the visible retro-reflection range, is very narrow, and a retroreflective article enabling to retroreflect light having a large incident angle, which is deflected off the front of the exposure surface in a specific direction at an angle greater than a predetermined angle, is very difficult to design and fabricate.

To improve the problems of the conventional retroreflective article like above, retroreflective articles such as those of U.S. Pat. No. 4,349,598, entitled "High Incidence Angle Retroreflective Material" or U.S. Pat. No. 4,895,428, entitled "High Efficiency Retroreflective Material" have been developed. These retroreflective articles can retroreflect mainly the incident light having its incident angle greater than about 45 degree in which its main reflecting direction is sharply deflected to a specific direction.

These retroreflective materials consist of reflective elements formed with a cube corner between two rectangular surfaces which meets the dihedral angle of about 90 degree and one triangle surface which perpendicularly crosses the two rectangular surfaces are arranged, and they have very high retroreflective ratio for the incident light having high incident angle since they are sharply deflected in a specific direction which is a main reflective direction having the highest retroreflective ratio.

Further, "Highly canted retroreflective cube corner article" disclosed in International publication No. WO 1998/20374 is a varied cube corner structure, and this also has very high retroreflective ratio for a specific incident light having high incident angle.

However, the above mentioned retroreflective materials retroreflect using three reflecting surfaces as same the cube corner which is a conventional retroreflective structure, and therefore they still have a problem which is raised in conventional retroreflective articles using cube corners, that is, the problem which they have high retroreflective ratio only for a specific incident light having incident angle greater than 45 degree but it has very low retroreflective ratio for a incident light having low incident angle, therefore the incident range enabling to retroreflect is very narrow. Further, the above mentioned retroreflective materials is not freely designed in its main reflective direction defined as the highest retroreflective ratio.

DISCLOSURE OF INVENTION

Technical Problem

Accordingly, the present invention is created to solve the above conventional problems, and an object of the present invention is to provide a retroreflective article enabling to increase its retroreflective ratio by reflecting an incident light using three or more than three reflecting surfaces according to its incident angle, to have a wide retroreflective range by widening a range of the incident angle, and to freely design a main reflective direction of the retroreflective article defined as the highest retroreflective ratio.

Technical Solution

To achieve the object of the present invention described above, the present invention provides a retroreflective article including at least one retroreflective element, the retroreflective element comprising at least one reflecting corner comprised of a pair of corner reflecting surfaces which meet at dihedral angle of about 90 degree; and a pair of vertical reflecting surfaces which are formed on both ends of the reflecting corner to be substantially perpendicular to a corner of the reflecting corner with a distance which is smaller than the highest vertical height and which meet at dihedral angle of about 90 degree for the pair of corner reflecting surfaces.

The highest vertical height is defined as the height of one of the vertical reflecting surfaces when two vertical reflecting surfaces have same height, whereas defined as the height higher than the other when two vertical reflecting surfaces have different height.

In the above structure, the retroreflective element includes more than two reflecting corners arranged in parallel between the two vertical reflecting surfaces.

Further, the distance between the two vertical reflecting surfaces of the retroreflective element is preferably less than ½ of the highest vertical height.

Further, the two vertical reflecting surfaces may be formed to have different vertical height, in this case the distance (t) between the two vertical reflecting surfaces is preferably less than ⅔ of the vertical height difference of the two vertical reflecting surfaces.

Further, in the case that the height of the two vertical reflecting surfaces of the retroreflective element is different, the retroreflective elements are arranged so that a vertical reflecting surface having lower vertical height directs same direction or so that a vertical reflecting surface having lower vertical height crossly directs opposite direction.

Further, a receiving light surface which receives the incident light entered on the retroreflective element at the upper portion of the retroreflective element may be formed to have an inclined angle of 1~60 degree with respect to the standard surface which is parallel with the corner of the reflecting corner.

Advantageous Effects

The retroreflective article according to the present invention can increase its retroreflective ratio by reflecting an incident light using three or more than three reflecting surfaces according to its incident angle and have widen retroreflective range by widening a range of the incident angle. Further, it can be freely designed its main reflective direction defined as the highest retroreflective ratio.

MODE FOR THE INVENTION

The above described object, characteristic, and advantages of the invention will become apparent from the following detailed description.

Hereinafter, the retroreflective articles according to various embodiments of the present invention will be described in detail with reference to the accompanying drawings.

First Embodiment

Figure 1:
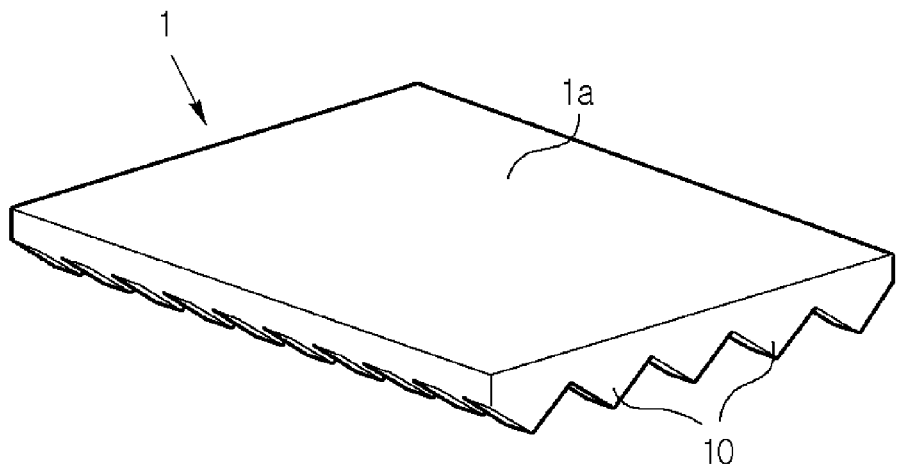
FIG. 1 is a partially enlarged perspective view illustrating a retroreflective article according to a first embodiment of the present invention.
Figure 2:
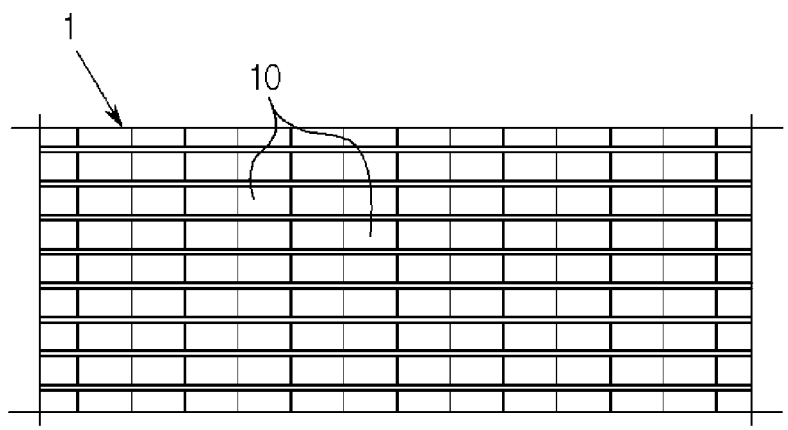
FIGS. 2 and 3 are plane and side views of the retroreflective article in FIG. 1.
Figure 3:
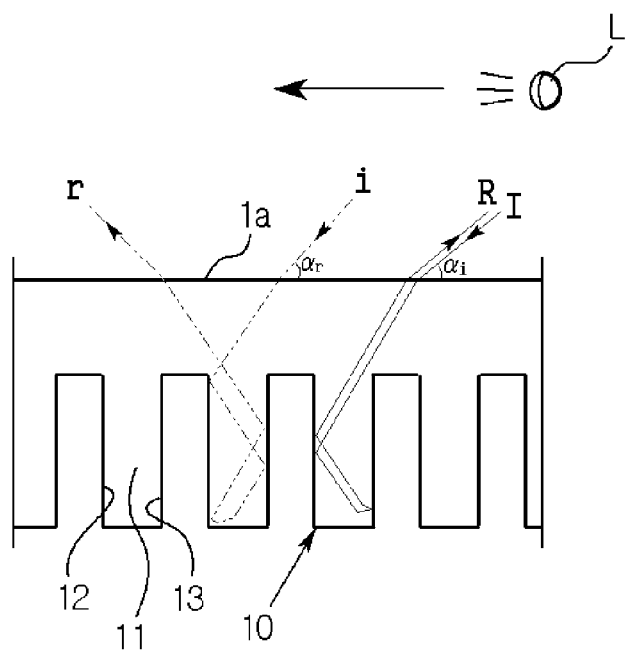

FIG. 1 shows a partially enlarged perspective view illustrating a retroreflective article according to a first embodiment of the present invention. FIGS. 2 and 3 show plane and side views of the retroreflective article in FIG. 1.

As shown, the retroreflective article 1 according to this first embodiment is formed with a flat light receiving surface 1a on the upper portion thereof and formed with retroreflective elements 10 to be closely arranged with a constant pattern on the bottom surface thereof.

Figure 4:
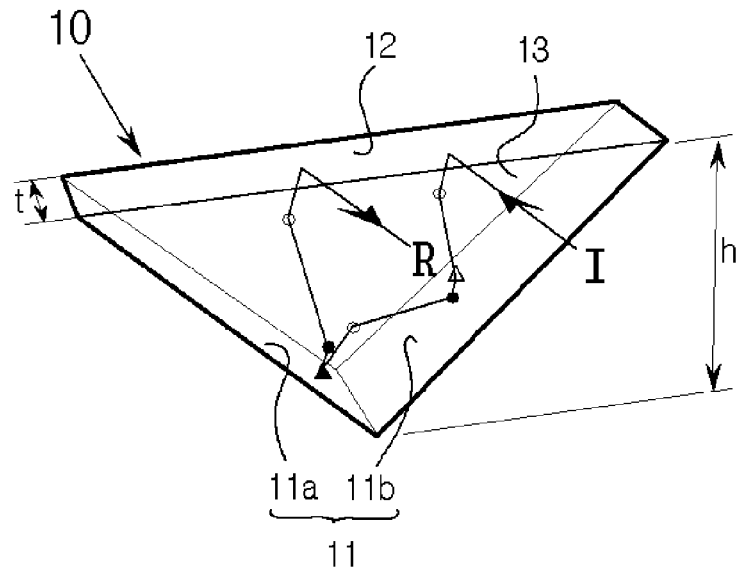
FIG. 4 is a perspective view illustrating retroreflective element of the retroreflective article according to a first embodiment of the present invention.

FIG. 4 is an enlarged perspective view of the retroreflective elements 10 which retroreflect the incident light which is entered through the receiving surface 1a in the retroreflective article 1.

As shown, the retroreflective element 10 of this first embodiment is composed of a reflecting corner 11 having right corner reflecting surfaces 11a and 11b which are perpendicular from each other, and a pair of vertical reflecting surfaces 12 and 13 vertically formed on the both sides of the reflecting corner 11 with a distance (t) smaller than a vertical height (h) of thereof.

Figure 5:
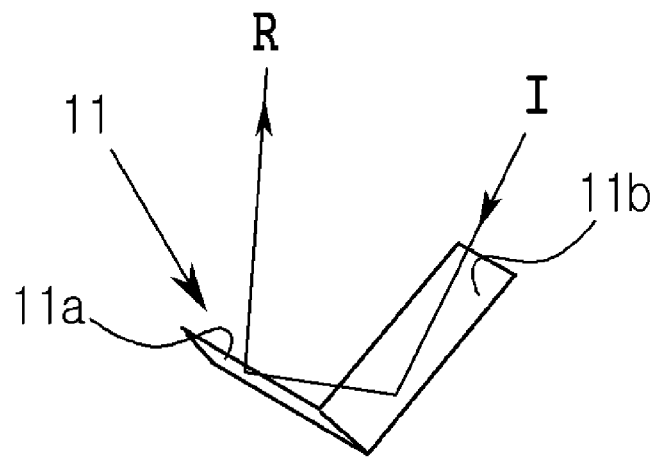
FIG. 5 is a perspective view illustrating a reflecting corner of the retroreflective element in FIG. 4.
Figure 6:
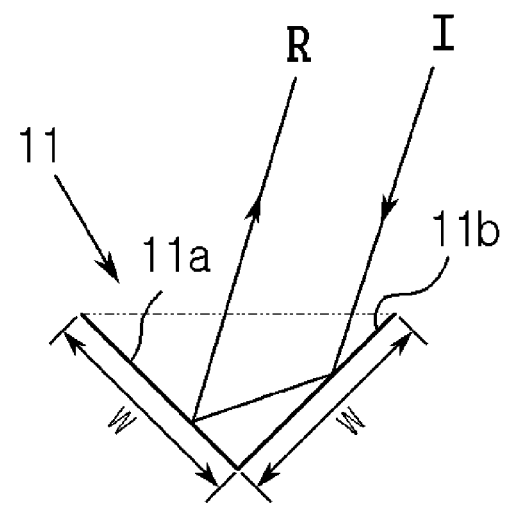
FIGS. 6 and 7 are plane and side views of the reflecting corner in FIG. 5.
Figure 7:
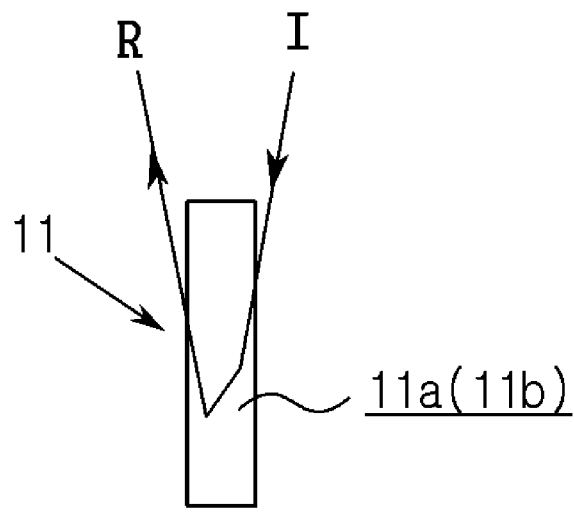

As shown in FIG. 5, the reflecting corner 11 has a reflecting structure in which a pair of rectangular corner surfaces 11a and 11b having band shape almost perpendicularly meet to form a dihedral angle. As shown in FIGS. 6 and 7 showing front and side thereof, this forms a reflecting structure like a total reflection prism, and performs corner reflection which changes the progressing direction of the incident light (I) to only the lengthwise direction of the reflecting corner.

In the reflecting corner 11, as shown in FIG. 4, the both corner reflecting surfaces 11a and 11b almost perpendicularly meet with the vertical reflecting surfaces 12 and 13, and then it is formed a retroreflective structure like a cube corner composed of three reflecting surfaces (one of the vertical reflecting surfaces 12 and 13 and both corner reflecting surfaces 11a and 11b). Therefore, the both corner reflecting surfaces 11a and 11b will retroreflect the incident light (I) entered on the reflecting corner 11 together with one of the vertical reflecting surfaces 12 and 13.

Figure 8:
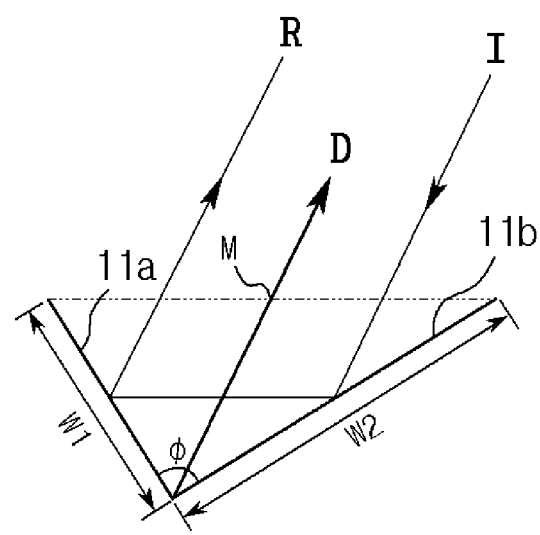
FIGS. 8 and 9 are cross sectional views of the reflecting corner of the retroreflective element in which its corner direction is deflected in the retroreflective article according to a first embodiment of the present invention.

As shown in FIG. 6, the left and right corner surfaces 11a and 11b of the reflecting corner 11 are formed to have same width (W) so that the reflecting corner 11 has a symmetrical structure in leftward and rightward. Alternatively, as shown in FIG. 8, they may be formed to have different widths (W1 and W2) so that the corner direction (D) defined as a median line which connects from the corner thereof to the midpoint (M) between the corner reflecting surfaces 11a and 11b according to the relative position of a light source is deflected toward the light source. Further, the dihedral angle ($\phi$) between the corner reflecting surfaces 11a and 11b may be slightly greater or smaller than 90 degree so that the incident light (I) is conically diffused and retroreflected by the reflecting element 10.

Figure 9:
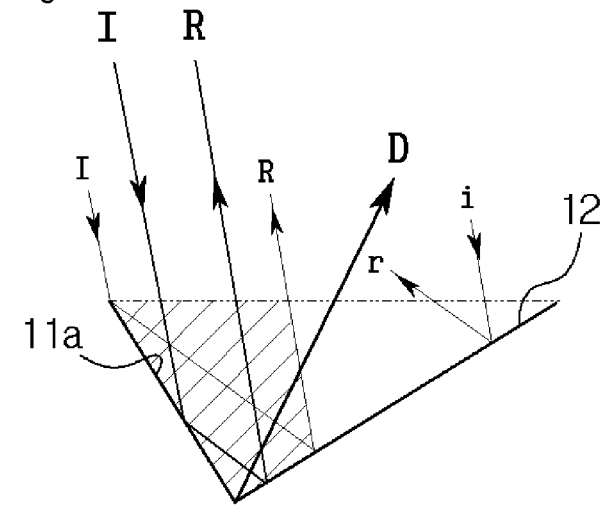

A corner reflecting ratio defined as a ratio of the light amount which can be corner reflected by the reflecting corner 11 of the total incident light (I) is changed according to the horizontal incident angle ($\alpha_W$) of the incident light (I). That is, in a case that the incident light (I) is entered to the corner direction (D), the incident light (I) is totally corner reflected, and therefore the corner reflecting ratio is highest. Meanwhile, when the incident direction is departed from the corner direction (D), the ratio of the light amount which can be corner reflected is decreased, and therefore the corner reflecting ratio is decreased. For example, as shown in FIG. 8, when the incident light (I) is entered to be parallel with the corner direction (D), it is totally corner reflected as the reflecting light (R) of the corner direction (D), and therefore the corner reflecting ratio is highest. Meanwhile, as shown in FIG. 9, when the incident direction of the incident light (I) is departed from the corner direction (D), the deviant crease lined area which can corner reflect is decreased, and therefore the corner reflecting ratio is decreased. The reflecting path expressed as 'i→r' is the progressing path of the incident light (i) in which it is not corner reflected but specular reflected because only the corner reflecting surface 11b of the reflecting corner 11 does reflect.

Figure 10:
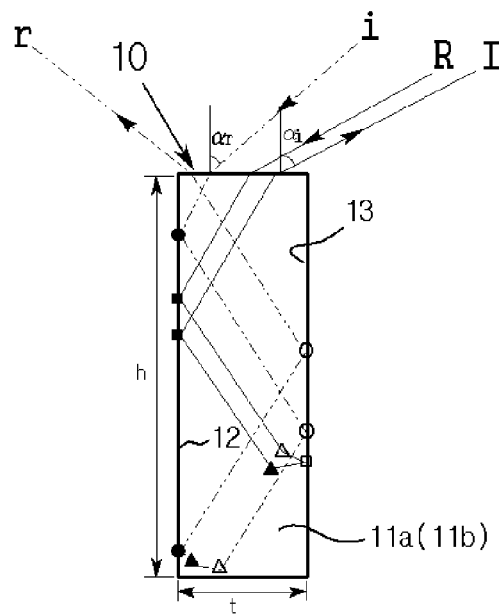
FIGS. 10 and 11 are side and cross sectional views illustrating a retroreflective path of the retroreflective article according to a first embodiment of the present invention.
Figure 11:
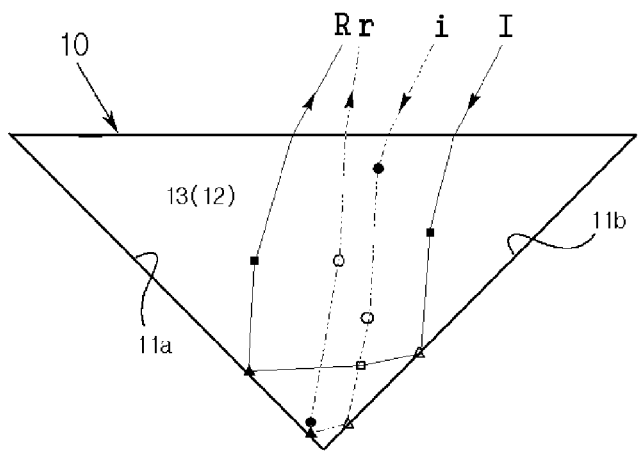

As shown in FIGS. 10 and 11, in this first embodiment, the vertical reflecting surfaces 12 and 13 of the retroreflective element 10 are formed to have a vertical height (h) much greater than the distance (t) there-between (h>>t). These vertical reflecting surfaces 12 and 13 alternatively specular reflect the incident light (I) in zigzag type and send it out of the element through the corner reflecting surfaces 11a and 11b.

The retroreflective element 10 having the above described structure, that is, the retroreflective element 10 composed of the reflecting corner 11 which performs corner reflection and two vertical reflecting surfaces 12 and 13 which perform specular reflection will selectively retroreflect or corner reflect the incident light according to its incident angle ($\alpha$) since the incident light is alternatively specular reflected in zigzag type by the two vertical reflecting surfaces 12 and 13 and retroreflected by means of cube corner typed retroreflective structure which is formed by the reflecting corner and one of the vertical surfaces 12 and 13. Therefore, in a case that the incident light is radiated from the light source (L) which is relatively moved, the alternation number of its specular reflection of the vertical surfaces 12 and 13 will be changed according to the change of the incident angle, and therefore retroreflection and specular reflection will be performed.

The retroreflective article according to this first embodiment, as like above, is formed that the retroreflective elements 10 which can retroreflect or corner reflect the incident light (I) according to its incident angle ($\alpha$) are closely arranged on the bottom surface thereof with a regular pattern. It can alternatively retroreflect and specular reflect the incident light (I) from the light source which is relatively moved according to the change of the incident angle ($\alpha$).

Therefore, the retroreflective article according to this first embodiment, as shown in FIG. 3, is recognized like flickering by an observer (e.g. a driver) of a light source which is relatively moved (e.g. a light of an automobile), and therefore its retroreflection range is very high.

Further, the retroreflective article according to this first embodiment can easily change the main reflecting direction having the highest retroreflection ratio defined as the ratio of the amount of retroreflected light with respect to that of incident light by means of the widths (W1, W2) of the corner reflecting surfaces 11a and 11b which compose the reflecting corner 11, and therefore it is free in change of the main direction (D).

The flickering principle of the retroreflective article according to the first embodiment will be definitely understood from the description for a second embodiment as follows.

Second Embodiment

Figure 12:
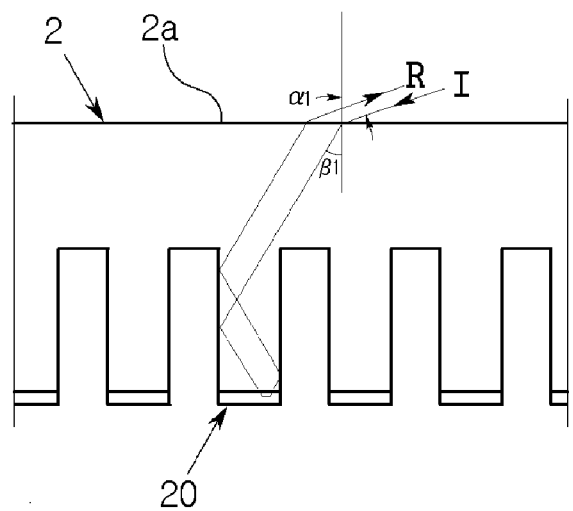
FIGS. 12 and 13 are side views illustrating a retroreflective path of the retroreflective article according to a second embodiment of the present invention.
Figure 13:
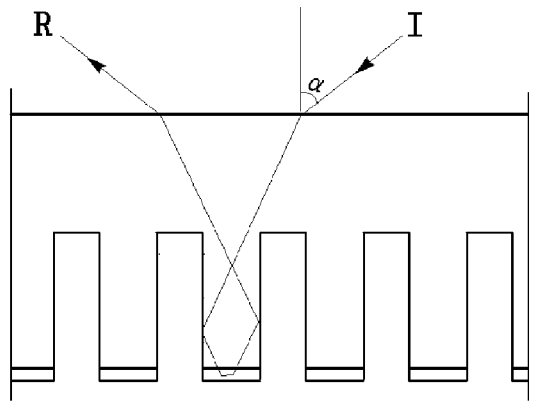
Figure 14:
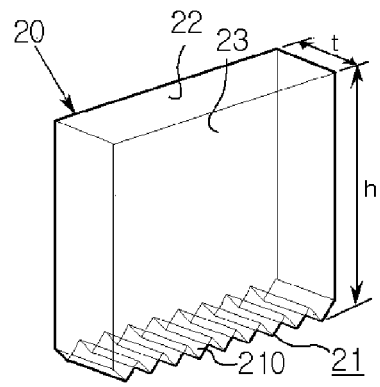
FIG. 14 is a perspective view illustrating a retroreflective element according to a second embodiment of the present invention.

FIGS. 12 and 13 are side views illustrating a retroreflective path of the retroreflective article according to a second embodiment of the present invention, and FIG. 14 is a partially enlarged perspective view illustrating a retroreflective element according to a second embodiment of the present invention.

As shown, the retroreflective element 20 of the retroreflective article according to this second embodiment includes a reflecting corner row 21 composed of reflecting corners 210 arranged in parallel on the same plane and becoming a bottom portion of the retroreflective element 20, and a pair of vertical reflecting surfaces 22 and 23 formed on both sides of the reflecting corner row 21 to be perpendicular with the reflecting corner 10 with a distance (t) smaller than its vertical height (h).

Figure 15:
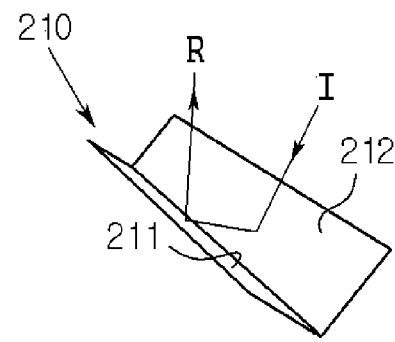
FIG. 15 is a perspective view illustrating a reflecting corner of the retroreflective element according to the second embodiment of the present invention.
Figure 16:
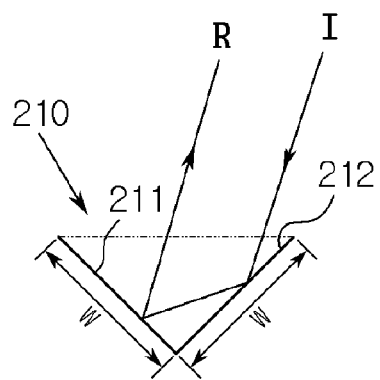
FIGS. 16 and 17 are front and side sectional views of the reflecting corner in FIG. 15.
Figure 17:
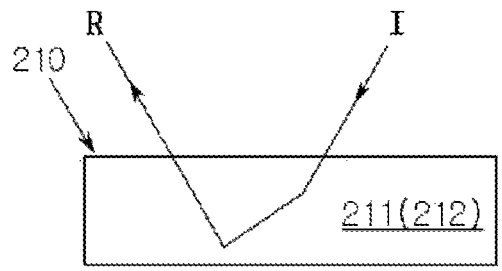

As shown in FIG. 15, the reflecting corners 210 forming the reflecting corner row 21 on the bottom portion of the retroreflective element 20 has a reflecting structure in which a pair of rectangular corner surfaces 211 and 212 having band shape perpendicularly meet to form a dihedral angle (.phi.), which forms a reflecting structure like a total reflection prism. As shown in FIGS. 16 and 17 which are cross sectional view and side view of FIG. 15, it is performed a corner reflection which the progressing direction of the light is changed to only the vertical direction of the reflecting corner. In the reflecting corner 210, the both corner reflecting surfaces 211 and 212 almost perpendicularly meet with one of the vertical reflecting surfaces 22 and 23, and then it is formed a retroreflective structure like a cube corner composed of three reflecting surfaces (one of the vertical reflecting surfaces 22 and 23 and both corner reflecting surfaces 211 and 212). Therefore, the incident light entered on the reflecting corner 210 will be retroreflected.

Figure 18:
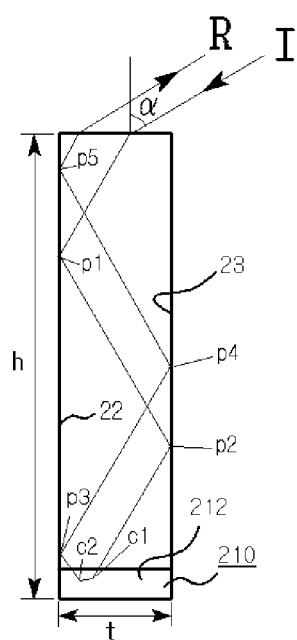
FIGS. 18 and 19 and FIGS. 20 and 21 are side and front views of the retroreflective element illustrating the retroreflective path of the retroreflective element according to the second embodiment of the present invention.
Figure 19:
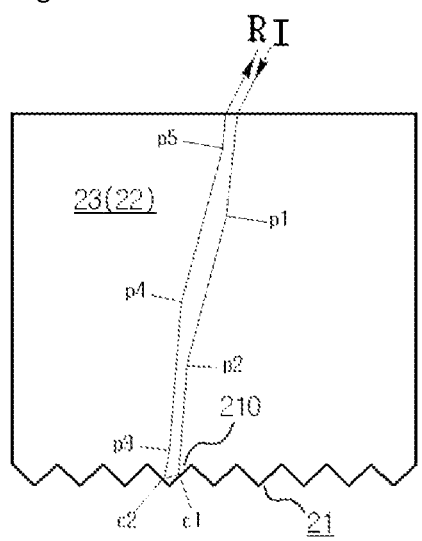
Figure 20:
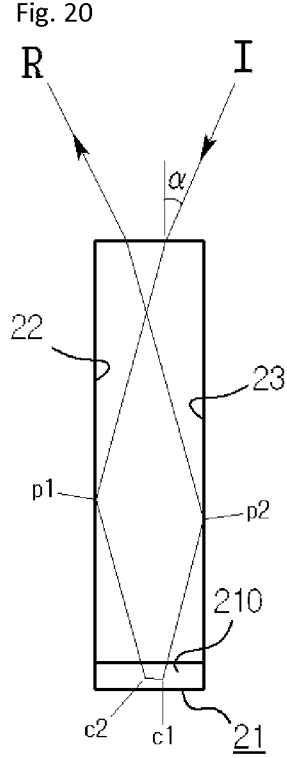
Figure 21:
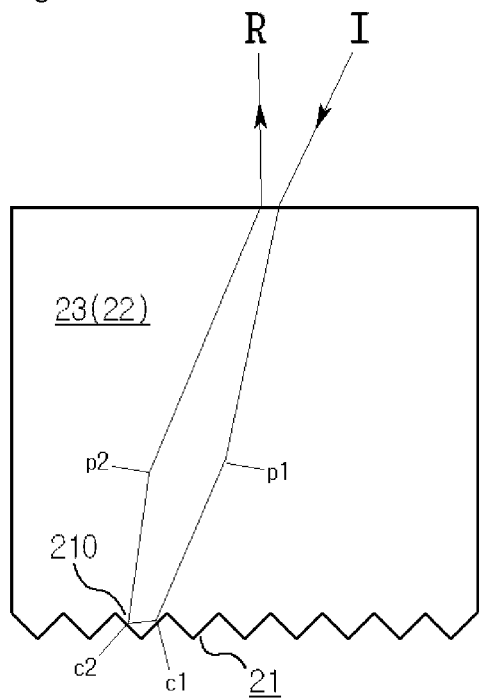

As shown in FIGS. 18 and 19, the vertical reflecting surfaces 22 and 23 formed on both sides of the reflecting corner 210 are formed to have a vertical height (h) greater than the distance (t) between them (h>t). This alternative specular reflect in zigzag type the incident light (I) irradiated from the retroreflective element 20 and projects it to the reflecting corner row 21 (p1→p2), and one of the vertical reflecting surfaces 22 and 23 makes a retroreflective structure together with the reflecting corner 210 which performs corner reflection (c1→c2), and then the light projected on the reflecting corner 210 is retroreflected (c1→c2→p3). And, the reflected light (R) which is retroreflected through the reflecting corner 210 is alternatively specular reflected in zigzag type (p4→p5), and then it is sent out of the retroreflective element 20.

In the retroreflective element 20 having the above described structure, as shown in FIGS. 18, 19, 20 and 21, the incident light (I) is alternatively specular reflected in zigzag type up to the reflecting corner row 21 by the vertical reflecting surfaces 22 and 23, and then it is retroreflected by the reflecting corner 10 of the reflecting corner row 21 together with one of the vertical reflecting surfaces 22 and 23. The reflected light (R) is again alternatively specular reflected in zigzag type by the vertical reflecting surfaces 22 and 23, and then it is sent out of the retroreflective element 20, which allows the incident light (I) to be retroreflected or corner reflected according to its incident angle.

Figure 22:
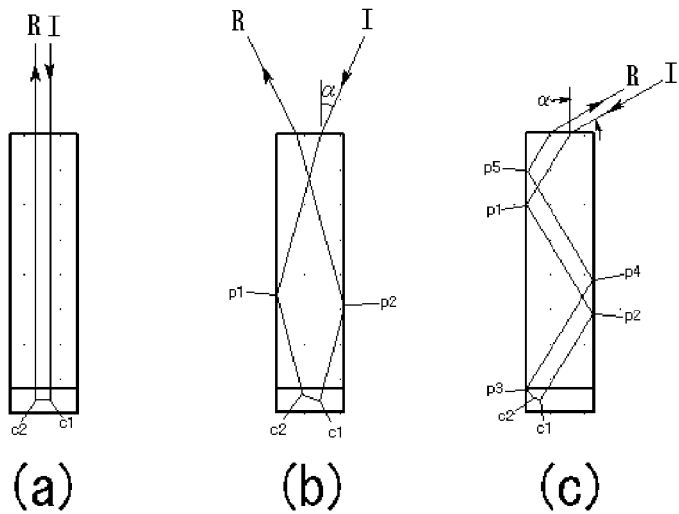
FIG. 22 is a side view expressing a reflecting path of the retroreflective element according to the second embodiment of the present invention.
Figure 22:
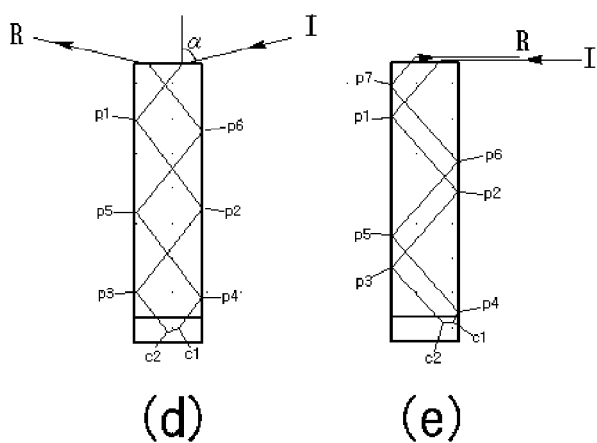

The retroreflective element 20 according to this second embodiment, as shown in FIG. 22(a), directly performs corner reflection using only the reflecting corner 210 without using the vertical reflecting surfaces 22 and 23 when the incident angle of the light is 0 degree. And, as shown in FIGS. 22(b)-(e), the element 20 will selectively perform retroreflection or corner reflection according to the dimension of the incident angle (α) when the incident angle (α) of the light is greater than 0 degree. That is, as shown in FIGS. 22(c) and (e), if the vertical reflecting surfaces 22 and 23 which finally specular reflect very before the light is out of the element 20 are the vertical reflecting surfaces 22, the light is retroreflected to the light source, whereas if they are the vertical reflecting surfaces 23, as shown in FIGS. 22(b) and (d), the light is retroreflected to an opposite side of the light source. And, when the incident angle (α) is varied from 0 degree to 90 degree by the relative movement of the light source, an observer who moves with the light source (e.g. a driver in an automobile) may observe flickering like since the incident light having its incident angle of 90 degree is alternatively retroreflected or corner reflected as much as the number (p1→p2→ . . . →p7) which the incident light crosses the vertical reflecting surfaces 22 and 23. The retroreflective element shown in FIG. 22 will be observed as like it is flickered in 3.5 times since it performs 7 times of alternative retroreflection and corner reflection while its incident angle (α) is varied from 0 degree to 90 degree. Therefore, the height (h) of the vertical reflecting surfaces 22 and 23 is at least 2 times or preferably more than 3 times of the distance (t) between them since the alternative number (flickering number) of the incident between the vertical reflecting surfaces 22 and 23 is increased when the distance between the vertical reflecting surfaces 22 and 23 is decreased.

The flickering period of the retroreflective element 20 becomes shorter since the alternative number of the retroreflection and corner reflection with respect to the relative movement distance of the light source is increased when the ratio of the distance (t) over the height (h) of the reflecting surfaces 22 and 23 is greater and when its refractive index is smaller. And also, the flickering period becomes shorter since the alternative period with respect to the relative movement distance is shorter when the relative movement velocity of the light source is faster.

FIGS. 12 and 13 show the reflecting path in which the incident light (I) is retroreflected or corner reflected by the retroreflective element 20 of the retroreflective article of the second embodiment according to its incident angle (α1).

Figure 23:
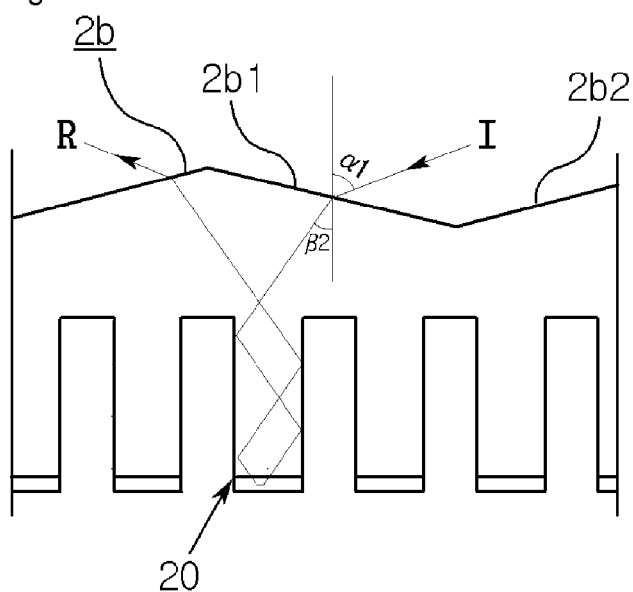
FIG. 23 is a side view of a changed retroreflective article according to a second embodiment of the present invention.

FIG. 23 is a changed embodiment of the retroreflective article of the second embodiment, and a receiving surface 2b has slanted receiving surfaces $2b_1$ and $2b_2$ which have different slant direction in geometric, and the slanted receiving surfaces $2b_1$ and $2b_2$ are alternatively arranged to form multilateral surfaces.

Like this retroreflective element, since the refractive index of the incident light (I) is released (β1<β2) comparing with the retroreflective article having flat incident surface 2a of FIG. 12 when the incident surface 2b is formed to be slanted, the number which the light crosses the vertical reflecting surfaces 22 and 23 while the light is entered and sent out even if its incident direction is same. And finally, the alternation number of retroreflection and corner reflection is increased when the incident angle (α) is varied by the relative movement of the light source, which allows it to be shown as like it is much often flickered.

Third Embodiment

Figure 24:
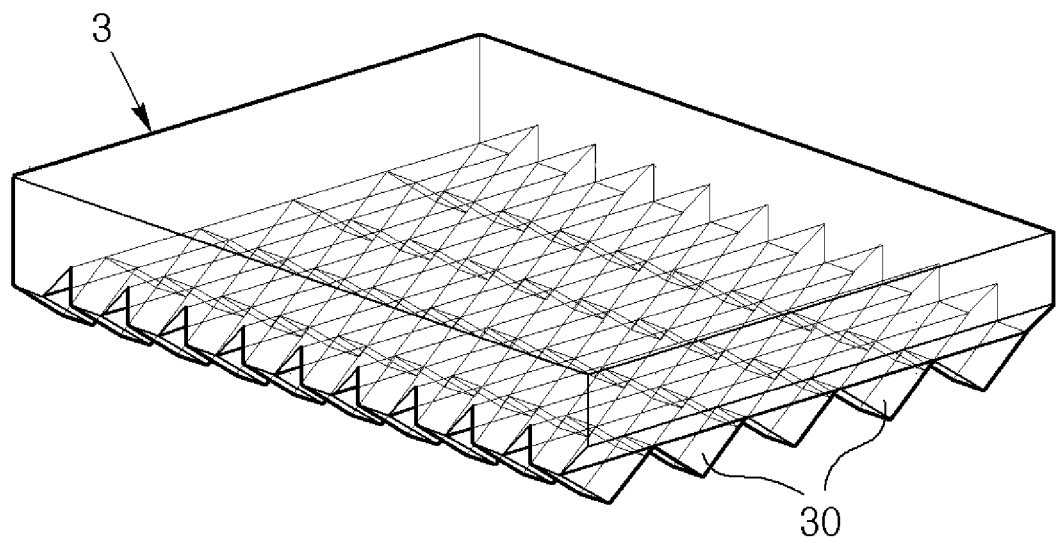
FIG. 24 is a perspective view illustrating a retroreflective article according to a third embodiment of the present invention.
Figure 26:
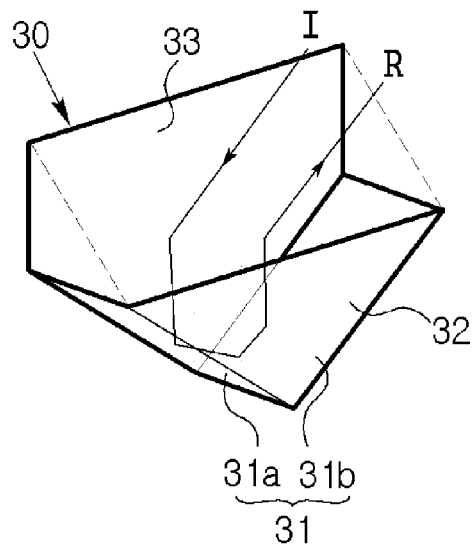
FIG. 26 is a perspective view illustrating a retroreflective element of the retroreflective article according to the third embodiment of the present invention.
Figure 27:
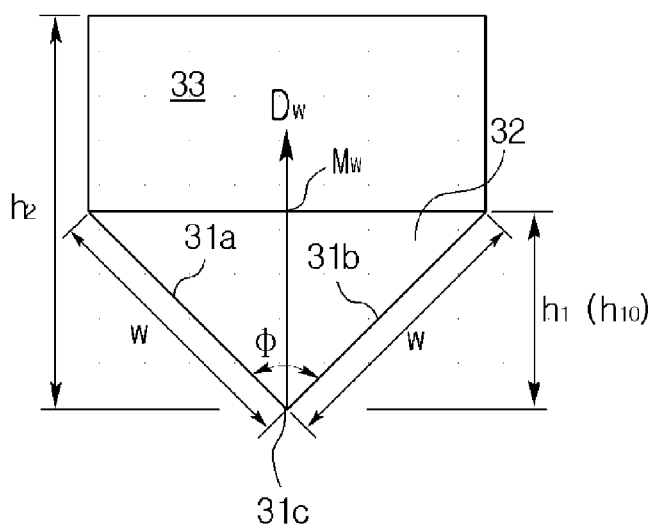
FIG. 27 is a front view of the retroreflective element in FIG. 26.

FIG. 24 shows a partially enlarged perspective view of a retroreflective article according to a third embodiment of the present invention, and FIG. 27 shows a side view of the retroreflective article in FIG. 24. And, FIG. 26 shows a partially enlarged perspective view of a retroreflective element of the retroreflective article according to the third embodiment.

The retroreflective article 3 according to the third embodiment of the present invention is manufactured to have thin plate shape with light permeable materials such as glasses, crystal, PMMA (Poly Methyl Meta Acrylate), polycarbonate, ultraviolet cured resin, acrylic. The article 3 can be covered with various cover layers such as a layer for covering the retroreflective article, an adhesive layer to be adhered on other objects, or a reflecting layer made of lustrous materials to increase the retroreflective ratio, on a receiving surface 3a of the bottom surface of upper portion thereof.

Figure 25:
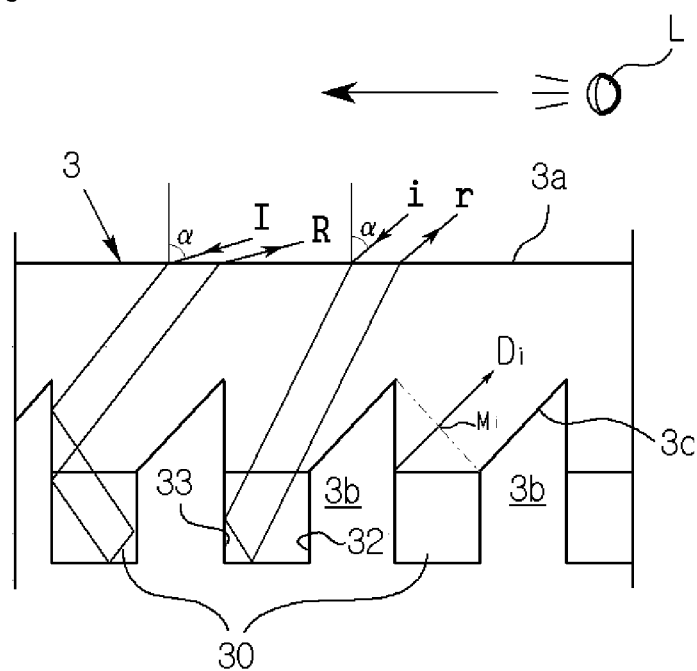
FIG. 25 is a side sectional view of the retroreflective article in FIG. 24.

As shown in FIGS. 24 and 25, the retroreflective article according to the third embodiment has a structure in which the retroreflective elements 30 are densely arranged with recesses 3b having an inclined surface 3c, the elements 30 having vertical reflecting surfaces 32 which have lower height of its bottom surface direct front side.

As shown in FIG. 26, the retroreflective element 30 includes a reflecting corner 31 composed of a pair of corner reflecting surfaces 31a and 31b which meets at a dihedral angle of about 90 degree, and a pair of vertical reflecting surfaces 32 and 33 formed on both ends of the reflecting corner 31 in the perpendicular direction of the corner of the reflecting corner 31.

Figure 28:
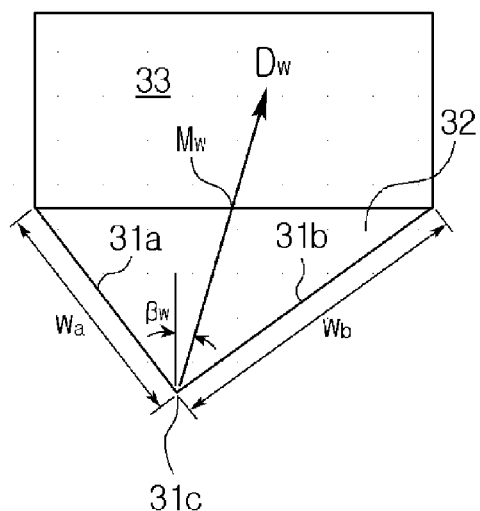
FIG. 28 is a front view of a changed retroreflective element according to the third embodiment of the present invention.

As shown in FIG. 27 which is the front view of FIG. 26, left and right corner reflecting surfaces 31a and 31b of the reflecting corner 31 have same width (W) and meet at a dihedral angle of 90 degree such that the reflecting corner 31 has symmetrical structure in leftward and rightward. Whereas, as shown in FIG. 28, the corner reflecting surfaces 31a and 31b may be formed to have different width $W_a$ and $W_b$ such that the corner direction $D_w$ (defined as the direction of midline connecting from the corner 31c of the reflecting corner to the midpoint ($M_w$) between the front ends of the reflecting surfaces 31a and 31b) is deflected toward any one of the reflecting surfaces 31a and 31b according to the relative position of the light source. The dihedral angle (φ) between the reflecting surfaces 31a and 31b may be designed to be slightly greater or smaller than 90 degree such that the incident light (I) can be diffusely reflected in conical shape by the retroreflective element 30.

Figure 29:
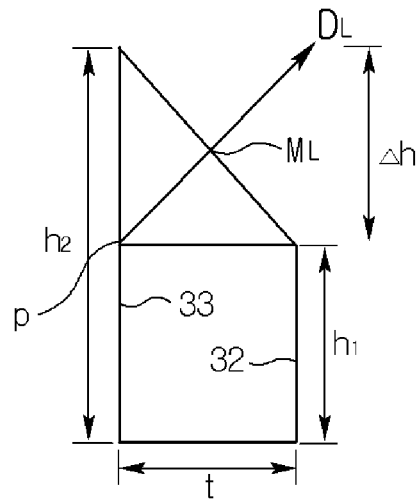
FIG. 29 is a side view of the retroreflective element in FIG. 26.

FIG. 29 is a side view of FIG. 26, as shown, the vertical reflecting surfaces 32 and 33 formed on the front and rear ends of the reflecting corner 31 have a difference in its height ($\Delta h = h_2 - h_1$) which is greater than the distance (t) between the vertical reflecting surfaces. The height difference ($\Delta h$) may be increased or decreased according to the relative position of the light source. And, the front vertical reflecting surface 32 having its height ($h_1$) is preferably formed to have its vertical height ($h_1$) which is at least same as or greater than the vertical height of the reflecting corner 30 (See the reference numeral $h_{10}$ in FIG. 27).

Figure 31:
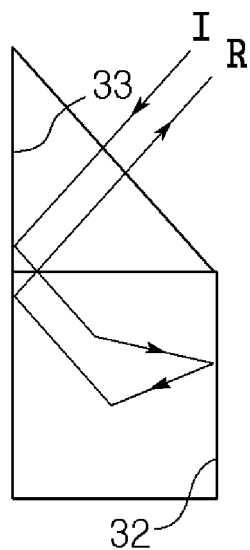
FIGS. 31 and 32 are side views of FIG. 26 expressing a change of the reflecting path according to a change of an incident angle of an incident light.

The retroreflective element 30 according to the third embodiment having the above described structure, as shown in FIG. 31 retroreflects the incident light (I) entering between the front and rear vertical reflecting surfaces 32 and 33 according to its incident angle (α). For example, when the incident angle (α) is greater, the incident light (I) is retroreflected by two corner reflecting surfaces 31a and 31b of the reflecting corner 31 and the front and rear vertical reflecting surfaces 32 and 33. Whereas, as shown in FIG. 32, when the incident angle (α) is smaller, the incident light (i) is retroreflected only by two corner reflecting surfaces 31a and 31b of the reflecting corner 31 and the rear vertical reflecting surface 33.

Generally, the retroreflective element of the retroreflective article is changed in retroreflective ratio since the area ratio of its available reflection surface is changed when the incident angle of the incident light is varied. Therefore, the retroreflective element possess the main reflecting direction (D) having the highest retroreflective ratio. Conventional retroreflective element using cube corner is very difficult to change its main reflecting direction in design, and therefore the main reflecting direction mainly does not greatly depart from the normal direction of the incident surface. Further, it has very low retroreflective ratio for the incident light having greater incident angle.

Figure 32:
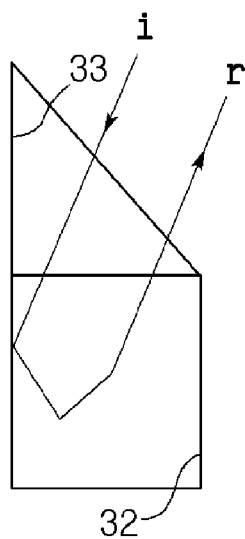

Whereas, the retroreflective element 30 of retroreflective article according to the present invention, as known in FIGS. 31 and 32, has higher retroreflective ratio for not only the incident light (I) having greater incident angle (α) but also the incident light (i) having greater incident angle (α).

Figure 30:
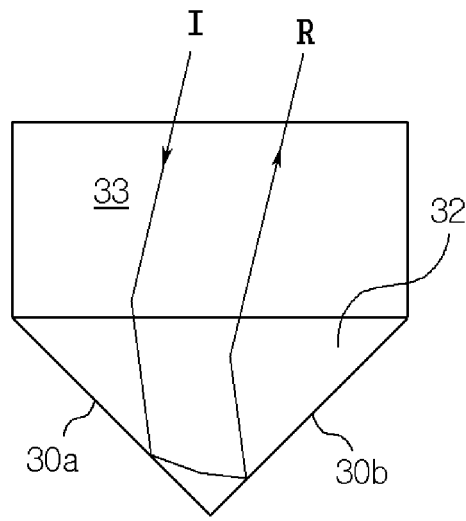
FIG. 30 is a front view of FIG. 26 expressing a reflecting path on the retroreflective element.
Figure 33:
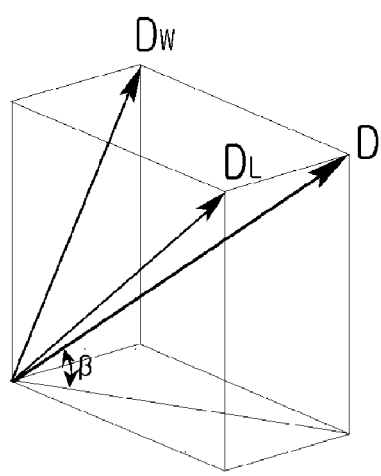
FIG. 33 is a view illustrating vector line of the main reflective direction of the retroreflective element according to the third embodiment of the present invention.

In the retroreflective element 30 of retroreflective article according to the third embodiment, the main reflecting direction (D) having the highest retroreflective ratio is decided by the height difference ($\Delta h$) of two vertical reflecting surfaces 32 and 33 having different height in geometric and the corner direction of the reflecting corner 30. That is, as shown in FIGS. 28 and 33, it is deflected toward the corner direction ($D_w$) defined as the direction of the midline which connects from the corner 31c of the reflecting corner to the midpoint ($M_w$) between front ends of left and right corner reflecting surfaces 31a and 31b. As shown in FIG. 30, it is deflected toward the corner direction ($D_L$) defined as the direction of a midline which connects from the intersected point (P) which the virtual horizontal surface crossing the upper end of the front vertical reflecting surface 32 and the rear vertical reflecting surface 33 are crossed from each other to the midpoint ($M_L$) between the upper ends of the front and rear vertical reflecting surfaces 32 and 33. Accordingly, as shown in FIG. 33, the main reflecting direction (D) of the reflecting corner 30 is a direction of vector sum of two corner directions ($D_w$) and ($D_L$). Finally, the main reflecting direction (D) of the reflecting corner 30 can be easily changed irrespective of its angle and direction by adjusting the height difference ($\Delta h = h_2 - h_1$) and the distance (t) of the vertical reflecting surfaces 32 and 33 which are design factors to determine the vertical corner direction ($D_L$) of the reflecting corner 30, and also by adjusting the slope and the widths ($W_a, W_b$) of the left and right corner reflecting surfaces 31a and 31b which are design factors to determine the horizontal corner directions ($D_w$). Specifically, it can be designed to have a characteristic in which the retroreflective ratio is higher for the incident light having greater incident angle (α).

The retroreflective article 3 according to the third embodiment having the above described structure may retroreflect mainly the incident light having greater incident angle since the main reflecting direction (D) of the reflecting corner 30 is forwardly deflected. Specifically, as shown in FIG. 27, the retroreflective ratio is advantageously not sharply decreased even if the incident angle (α) of the incident light becomes to be smaller than the deflection angle (See, β in FIG. 33) of the main reflecting direction (D) owing to the relative movement of the light source (L). And, the main reflecting direction (D) having the highest retroreflective ratio may be easily changed irrespective of its angle and direction by adjusting the widths ($W_a, W_b$) of the left and right corner reflecting surfaces 31a and 31b of the reflecting element 1 and the height difference ($\Delta h$) of the front and rear vertical reflecting surfaces ($h_1, h_2$) according to the relative position of the light source (L).

Figure 34:
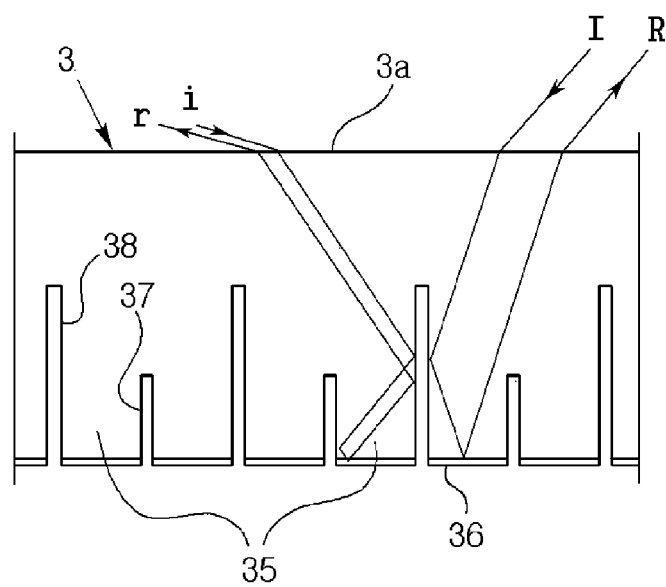
FIG. 34 is a side view of a changed retroreflective article according to the third embodiment of the present invention.
Figure 35:
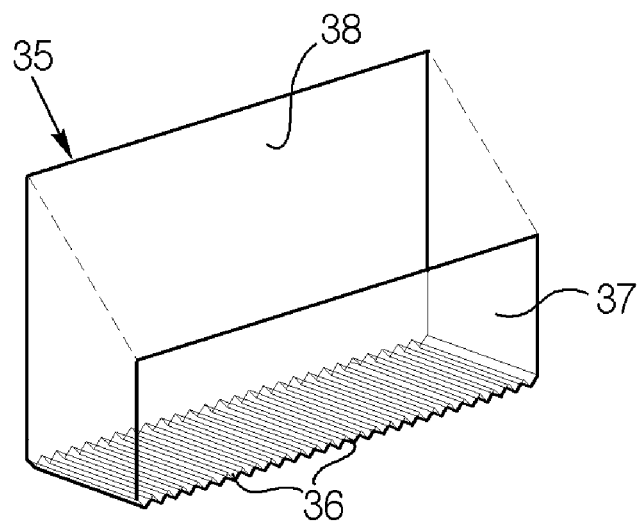
FIG. 35 is a perspective view of a changed retroreflective element according to the third embodiment of the present invention.

FIG. 34 shows a side section view of a changed retroreflective article according to the third embodiment of the present invention, and FIG. 35 shows a perspective view of the retroreflective article in FIG. 34.

As can be known in this changed embodiment, the retroreflective element 35 of the retroreflective article 3 according to the third embodiment of the present invention may be formed so that a plurality of reflecting corners 36 are densely arranged in parallel on the bottom portion of the front and rear vertical reflecting surfaces 37 and 38.

As shown in FIG. 35, the retroreflective element 35 makes a cube corner typed retroreflective structure together with the front and rear vertical reflecting surfaces 37 and 38 to retroreflect. Comparing with the retroreflective element 30 in FIG. 26, its retroreflective principle is substantially same and its operation and effect are also almost same even if its structure is slightly different.

As can be known in this changed embodiment, in the retroreflective article 3 according to the third embodiment of the present invention, the retroreflective element may be variously changed in its relative size and amount of the reflecting corner 36 for the front and rear vertical reflecting surfaces 37 and 38 according to the requirements of its design. In this case, the main reflecting direction (D) and the retroreflective ratio will be changed by only the vertical corner direction ($D_L$) and the horizontal corner directions ($D_w$), but it is almost not affected by the size, the amount or the height of the vertical reflecting surface of the reflecting corner 36.

Merely, comparing with the retroreflective element 30 in FIG. 26, in the retroreflective element 35 according to this changed embodiment, the horizontal corner directions ($D_w$) may adjusted by varying the width ratio of the left and right corner reflecting surfaces of the retroreflective element 35 when it is designed. Accordingly, the direction of the main reflecting direction (D) having the highest retroreflective ratio may be advantageously changed in horizontal direction.

Specifically, as shown in FIG. 34, the retroreflective article according to this changed third embodiment is that the retroreflective element 35 whose main reflecting direction (D) is opposite since the vertical corner direction ($D_L$) is opposite. This retroreflective article can retroreflect in two directions with higher retroreflective ratio, accordingly, for example, it can be usefully applied to the center lines of a road or the road surface of a pedestrian crossing having light sources on both sides there of so as to increase the retro-reflection range.

Figure 36:
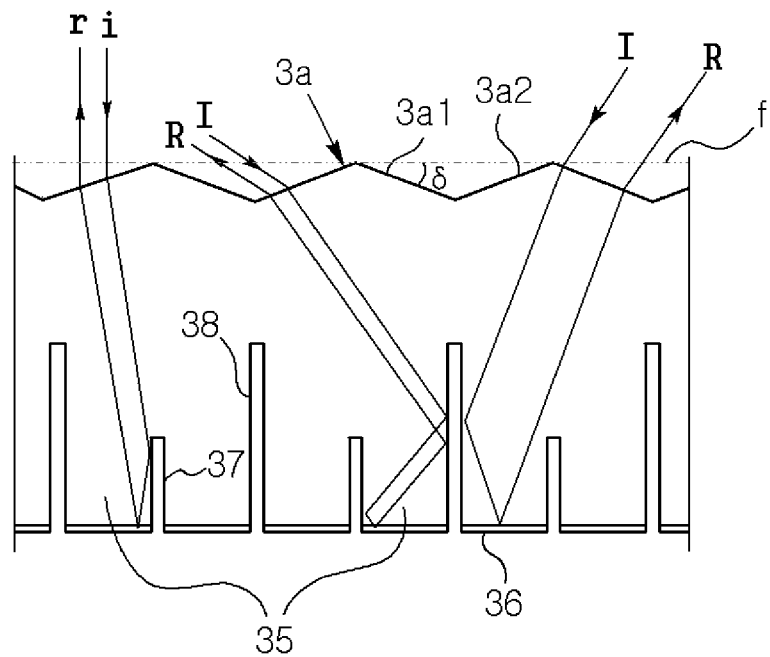
FIG. 36 is a side view of a further changed retroreflective article according to the third embodiment of the present invention.

FIG. 36 shows another retroreflective article according to further changed embodiment of the third embodiment. As shown, in the retroreflective article, the light receiving surface 3a has multilateral surfaces structure in which the slanted light receiving surfaces 3a1 and 3a2 having different slanting direction from each other are alternatively arranged. The slanted light receiving surfaces 3a1 and 3a2 are slanted with the slanted angle ($\delta$) of 1~60 degree, preferably 5~45 degree with respect to the standard surface (f) which is a virtual surface parallel with the corner 36c of the reflecting corner 36, which enlarges the light receiving area of the light receiving surface 3a for the incident light (I) having greater incident angle ($\alpha$) and decreases the angle of refraction of the incident light (I) on the light receiving surface 3a. Therefore, it performs to increase the retroreflective ratio of the retroreflective element 35 for the incident light (I) having greater incident angle ($\alpha$).

Comparing with the retroreflective article in FIG. 34, this retroreflective article has higher retroreflective ratio since the slanted light receiving surfaces 3a1 and 3a2 receives the incident light and the light receiving area is enlarged for the incident light having greater incident angle ($\alpha$). And, the retroreflective article can retroreflect even the incident light (i) having the incident angle ($\alpha$) of 0 degree since the incident light (i) which is perpendicularly entered may be retroreflected toward the vertical reflecting surface. Therefore, a designer can freely adjust the deflection angle of the main reflecting direction (D) of the retroreflective element 35 by adjusting the slanted angle ($\delta$) of the slanted light receiving surfaces 3a1 and 3a2 considering the refractive index of its materials, the height difference of the front and rear vertical reflecting surfaces 37 and 38, and the distance between the retroreflective element 35 and the light receiving surface 3a. Specifically, when the slanted angle ($\delta$) of the slanted light receiving surfaces 3a1 and 3a2 is designed to be greater than 30 degree, a retroreflective article having high retroreflective ratio for the incident light having small incident angle ($\alpha$) (that is, the incident light entered to front of the retroreflective article) can be manufactured since the deflection angle of the main reflecting direction is smaller.

Fourth Embodiment

Figure 37:
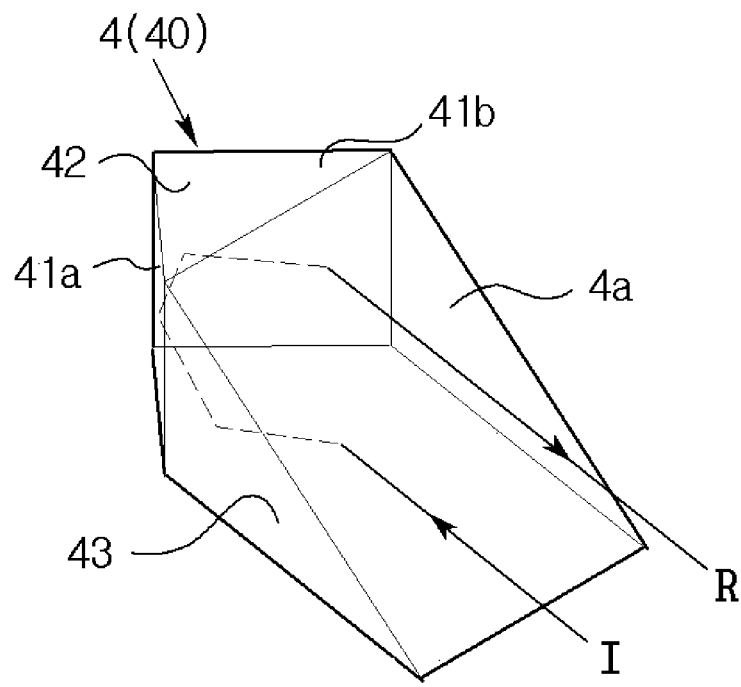
FIG. 37 is a perspective view of a retroreflective article according to a forth embodiment of the present invention.
Figure 38:
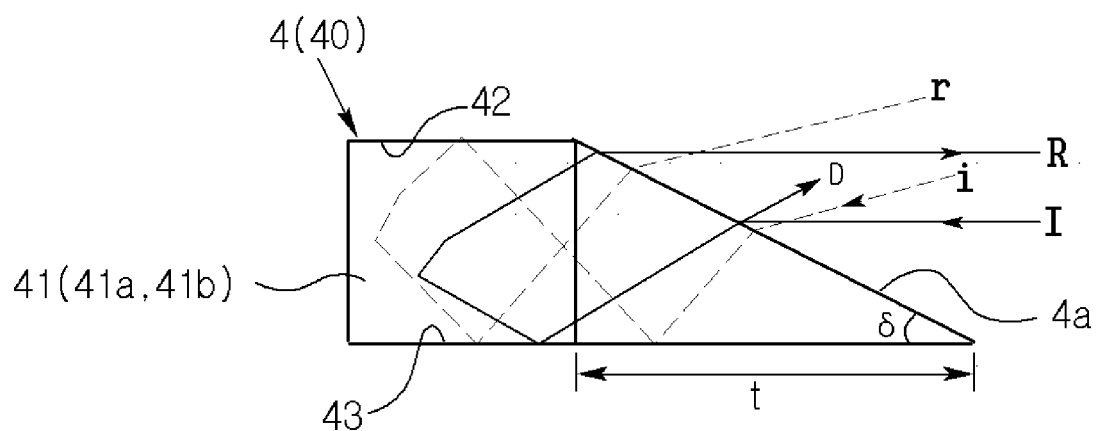
FIG. 38 is a side view of the retroreflective article in FIG. 37.

FIG. 37 shows a perspective view of a retroreflective article according to a fourth embodiment of the present invention, and FIG. 38 shows a side view of the retroreflective article in FIG. 37.

As shown in FIG. 37, the retroreflective article 4 according to this fourth embodiment is composed of single retroreflective element 40. The retroreflective element 40 is formed with a light receiving surface 4a having its slanted angle ($\delta$) of 35 degree on the front side thereof, and formed with a reflecting corner 41 composed of left and right corner reflecting surfaces 41a and 41b on the rear side thereof. Also, it is formed with vertical reflecting surfaces 42 and 43 having the height difference ($\Delta h$) on the upper and lower portion thereof.

This retroreflective article is made of a material having the refractive index of 1.4~1.6, and also it is designed to retroreflect the incident light entered from its front side with the highest retroreflective ratio. As shown in FIG. 38, when the incident light (I) is entered from its front side, it can be retroreflected toward the main reflecting direction of the retroreflective element on the light receiving surface 4a, and therefore it can be retroreflected with the highest retroreflective ratio. And, when the incident angle of the incident light (i) for the light receiving surface is smaller owing to the relative movement of the light source, the incident light (i) can be retroreflected toward the reflecting path shown with broken lines in FIG. 38 using the vertical reflecting surfaces 42 and 43, and therefore its retroreflective ratio is not sharply decreased.

Although the preferred embodiments of the present invention have been described, it is understood that the present invention should not be limited to this preferred embodiment but various changes and modifications can be made by one skilled in the art within the sprit and scope of the present invention aimed.

INDUSTRIAL APPLICABILITY

The retroreflective article according to the present invention has higher retroreflective ratio and wider available retroreflective range, and it is designed to be freely changed its main reflecting direction having the highest retroreflective ratio. Therefore, it can be applied to a variety of traffic safety facilities such as traffic signs, pavement markers, delineators and tripods or goods which should be importantly confirmed their visibility at rainy day or at night such as safety clothes, automobiles, bicycles, helmets and shoes as one retroreflective means.

The invention claimed is:

1. A retroreflective device including at least one retroreflective element, the retroreflective element comprising:
   at least one corner, the corner being formed by two reflective corner faces substantially perpendicular to each other; and
   two mutually parallel vertical reflective faces, each vertical reflective face being in direct contact with and substantially perpendicular to the corner faces;
   wherein a distance between the vertical reflective faces is smaller than a vertical height of the vertical reflective faces,
   wherein a light beam retro-reflects from the device via the two corner reflective faces and the two vertical reflective faces.

2. The retroreflective device according to claim 1, wherein the retroreflective element comprises two or more corners arranged in parallel between the two vertical reflective faces.

3. The retroreflective device according to claim 1, wherein the distance between the two vertical reflective faces is less than or equal to ½ of the highest vertical height (h) of the vertical reflective faces.

4. The retroreflective device according to claim 1, wherein the two vertical reflective faces have different vertical heights.

5. Previously Presented) The retroreflective device according to claim 4, wherein the distance between the two vertical reflective faces is less than or equal to ⅔ of a difference in the vertical heights.

6. The retroreflective device according to claim 4, wherein a plurality of the retroreflective elements is arranged so that the vertical reflective face having a lower vertical height and the vertical reflective face having a larger vertical height are alternated from each other on a regular basis.

7. The retroreflective device according to claim 4, wherein a plurality of the retroreflective elements is arranged so that the vertical reflective faces having a smaller vertical height face each other.

8. The retroreflective device according to claim 4, wherein a difference in the vertical heights is greater than the distance between the two vertical faces.

9. The retroreflective device according to claim 4, wherein a light incident face at a top of the element inclines at a predetermined angle.

10. The retroreflective device according to claim 4, wherein a light-incident face at a top of the element comprises a plurality of inclined faces.

11. The retroreflective device according to claim 10, wherein inclination angles of the plurality of inclined faces are in a range of 5~45 degrees.

12. The retroreflective device according to claim 1, wherein a light-incident face at a top of an element inclines at a predetermined angle.

13. The retroreflective device according to claim 1, wherein a light-incident face at a top of the element comprises a plurality of inclined faces.

14. The retroreflective device according to claim 13, wherein inclination angles of the inclined faces are in a range of 5~45 degrees.

15. A retroreflective structure, comprising:
   at least one corner, the corner being formed by two corner reflective faces substantially perpendicular to each other; and
   two mutually parallel vertical reflective faces, each vertical reflective face being in direct contact with and substantially perpendicular to both corner faces;
   wherein a distance between the vertical reflective faces is smaller than a vertical height of the vertical reflective faces,
   wherein a light beam retro-reflects from the structure via the two corner reflective faces and the two vertical reflective faces.

* * * * *